United States Patent
Walker

[11] Patent Number: 5,825,431
[45] Date of Patent: Oct. 20, 1998

[54] H-SYNC TO PIXEL CLOCK PHASE DETECTION CIRCUIT

[75] Inventor: John M. Walker, Richardson, Tex.

[73] Assignee: Eastman Kodak Company, Rochester, N.Y.

[21] Appl. No.: 768,693

[22] Filed: Dec. 18, 1996

[51] Int. Cl.$^6$ ............................................. H04N 7/54
[52] U.S. Cl. ................... 348/536; 348/537; 348/540; 375/362
[58] Field of Search .................... 348/536, 537, 348/540, 541; 375/362, 364; H04N 7/54, 5/04, 5/08

[56] References Cited

U.S. PATENT DOCUMENTS

| | | | |
|---|---|---|---|
| 4,532,547 | 7/1985 | Bennett | 348/536 |
| 4,959,718 | 9/1990 | Bennett | 348/536 |
| 5,455,935 | 10/1995 | Taylor | 395/550 |
| 5,539,473 | 7/1996 | Kommrusch et al. | 348/537 |

*Primary Examiner*—Glenton B. Burgess
*Attorney, Agent, or Firm*—William F. Noval

[57] ABSTRACT

An H-sync to pixel clock phase detection circuit comprising: a programmable delay line for delaying an H-sync signal; a differential clock driver circuit for producing a pixel clock signal and a pixel clock/signal from a pixel clock signal input; a first D flip-flop having D and CLK inputs and a $\bar{Q}$ output; a second D flip-flop having D and CLK inputs and a Q output; wherein the delayed H-sync signal from the programmable delay line is applied to the respective D inputs of the first and second D flip-flops, wherein the pixel clock signal from the differential clock driver circuit is applied to the CLK input of the first D flip-flop, and wherein the pixel clock/signal from the differential clock driver is applied to the CLK input of the second D flip-flop; and a third D flip-flop having D and CLK inputs and a Q output; wherein the $\bar{Q}$ output of the first D flip-flop is applied to the D input of the third D flip-flop, wherein the Q output of the second flip-flop is applied to the CLK input of the third D flip-flop; and wherein the Q output of the third D flip-flop is set when the rising edge of H-sync occurs after the rising edge of pixel clock, but before the falling edge of pixel clock.

1 Claim, 9 Drawing Sheets

H-SYNC TO PIXEL CLOCK PHASE DETECTION CIRCUIT

FIELD OF INVENTION

The present invention relates in general to image capturing devices and relates in particular to a device for capturing and digitizing medical images.

BACKGROUND OF THE INVENTION

In traditional film/screen medical diagnostic imaging, an anatomical part of a patient is positioned between an x-ray source and an unexposed film/screen, and an x-ray exposure is taken of the anatomical part to produce a latent film image. After the image is developed, it is viewed on a light box by a diagnostician (radiologist/physician). More recently, medical diagnostic imaging modalities (e.g., CT, MRI, PET, US) have been placed into operation and used to output electronic images of anatomical parts for presentation and review on a video monitor. Frequently, it is desirable to produce a hard copy of the displayed video image. One method for accomplishing this goal is to take a photographic picture of the displayed image. This method is undesirable because of the lower quality and image resolution of the taken picture.

It is often times the case that a single image taken by a diagnostic imaging modality will be reviewed by different persons at different locations and at different times. In the past multiple copies of the hard copy of the taken image were produced and distributed to physicians and technicians for review and consideration. The cost of reproducing the images is often times extraordinary, and in some instances the quality of the reproduction is less than satisfactory.

Accordingly, there is a need for an interface between a selected medical imaging modality and a data communications network or data storage device, wherein the interface operates to capture and digitize the video outputs from the selected medical imaging modality. Once captured and digitized, the video image can be retrieved whenever needed for physician and technician review and consideration, and transmitted electronically for remote review and consideration.

SUMMARY OF THE INVENTION

According to the present invention, there is provided a solution to the needs discussed above.

According to a feature of the present invention, there is provided an H-sync to pixel clock phase detection circuit comprising: a programmable delay line for delaying an H-sync signal; a differential clock driver circuit for producing a pixel clock signal and a pixel clock/signal from a pixel clock signal input; a first D flip-flop having D and CLK inputs and a $\overline{Q}$ output; a second D flip-flop having D and CLK inputs and a Q output; wherein the delayed H-sync signal from the programmable delay line is applied to the respective D inputs of the first and second D flip-flops, wherein the pixel clock signal from the differential clock driver circuit is applied to the CLK input of the first D flip-flop, and wherein the pixel clock/signal from the differential clock driver is applied to the CLK input of the second D flip-flop; and a third D flip-flop having D and CLK inputs and a Q output; wherein the $\overline{Q}$ output of the first D flip-flop is applied to the D input of the third D flip-flop, wherein the Q output of the second flip-flop is applied to the CLK input of the third D flip-flop; and wherein the Q output of the third D flip-flop is set when the rising edge of H-sync occurs after the rising edge of pixel clock, but before the falling edge of pixel clock.

BRIEF DESCRIPTION OF THE DRAWINGS

A more complete understanding of the method and apparatus of the present invention may be acquired by reference to the following Detailed Description when taken in conjunction with the accompanying drawings wherein.

DETAILED DESCRIPTION OF THE INVENTION

Figure 1:
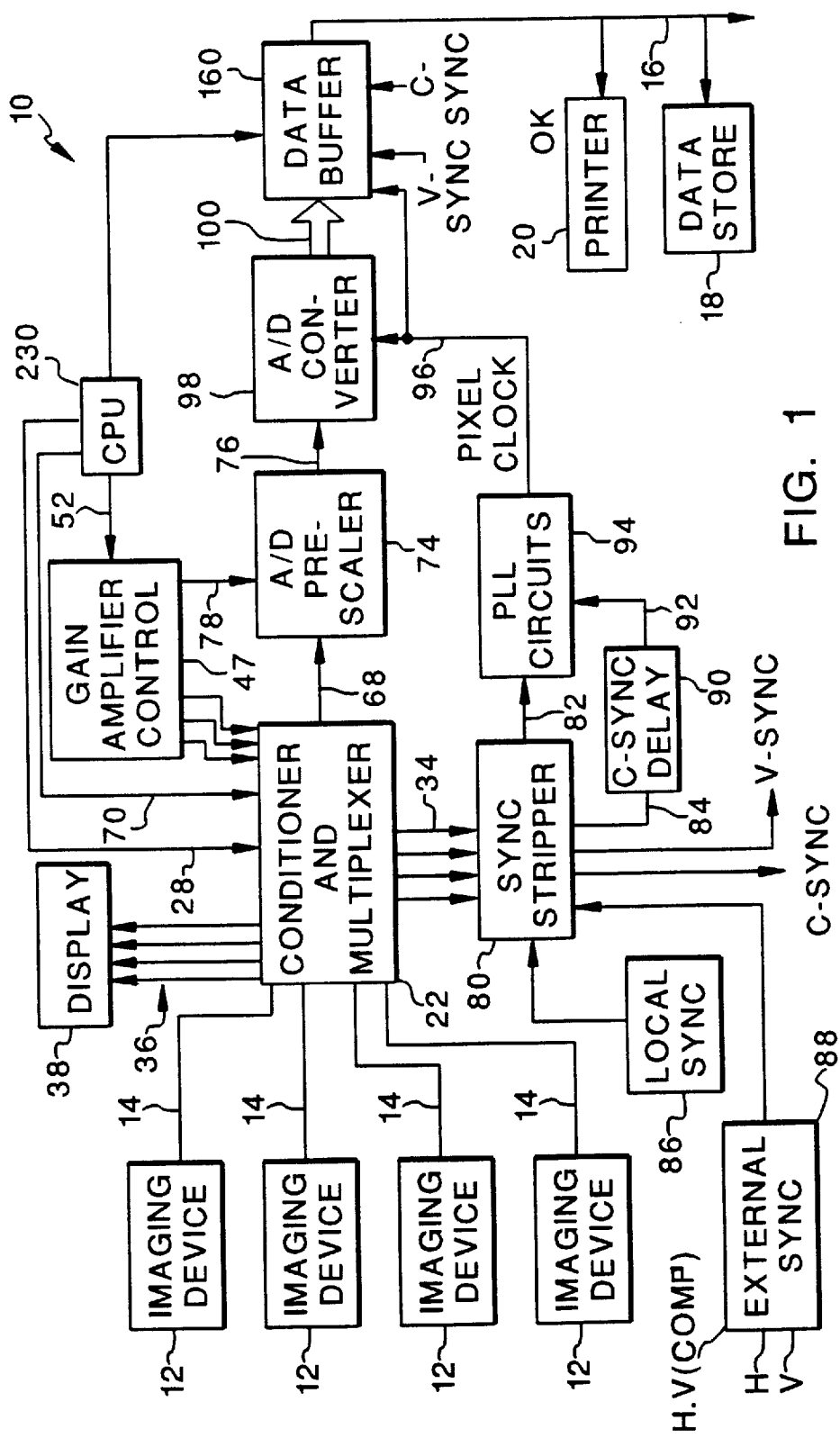
FIG. 1 is a block diagram of an embodiment of the image capturing device of the present invention.

Reference is now made to FIG. 1 wherein there is shown a block diagram of the image capturing device 10 of the present invention. The image capturing device 10 receives analog image signals output from a plurality (e.g., 4 as shown) of imaging devices 12 and transmitted over a corresponding plurality of channels 14. The imaging devices 12 may include, but are not necessarily limited to, medical imaging modalities such as a magnetic resonance imaging (MRI) system, a ultrasound (US) device, a computer aided tomography (CT) scan system or any other medical or non-medical digital imaging systems that images an object of interest. The image capturing device 10 operates to receive the analog image signals transmitted over the channels 14 and, responsive to an operator selection of one of those signals, capture and output digitized images in a format suitable, (1) for transmission over a digital communications network bus 16 (for example, a PCI bus), and/or (2) for storage in a data store 18 to be retrieved and used at a later date, and/or (3) for printing to hard copy by a printer 20 (such as a laser printer).

Figure 2:
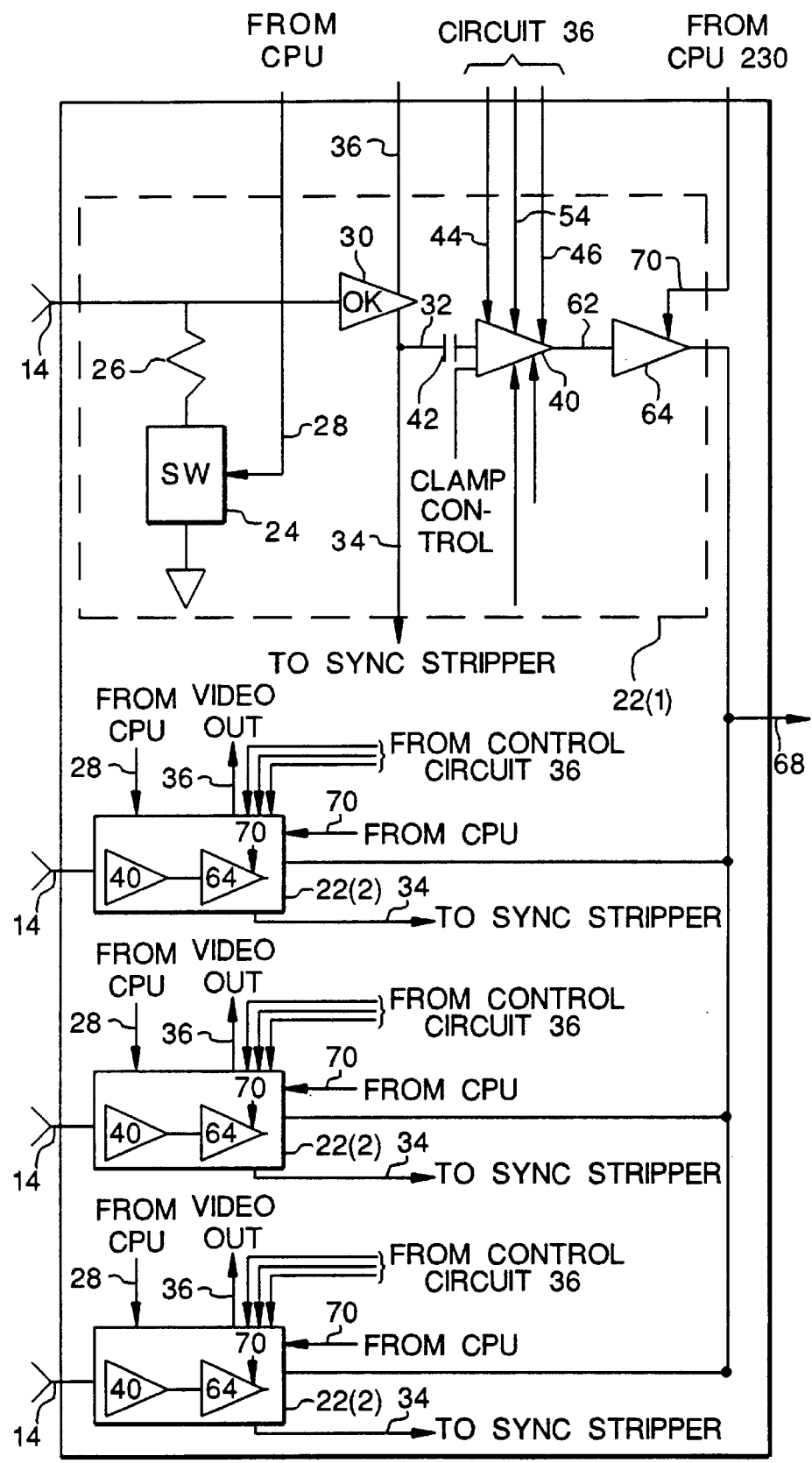
FIG. 2 is a block diagram of a high frequency video signal conditioner and multiplexer used in the device of FIG. 1.

The image capturing device 10 includes a multi-channel (4 channel) high frequency video signal conditioner and multiplexer 22 for conditioning and multiplexing the image signals received over the channels 14 from the imaging devices 12. A block diagram of one channel 22 (1) of the multi-channel high frequency video signal conditioner and multiplexer 22 is shown in FIG. 2. Each of the analog image signals received from the imaging devices 12 over the channels 14 is selectively applied by switch 24 to a 75 ohm termination 26. This termination provides for matching of the image capturing device 10 to the 75 ohm video cables commonly used to carry the analog image signals output from the imaging devices 12. Matching prevents the occurrence of reflections along the cable that adversely affect the quality of the received video signals by introducing artifacts into the digitized images. Responsive to a command received on line 28, switch 24 enables and disables the 75 ohm termination 26. When disabled, the cable connections to the image capturing device 10 over channels 14 must be kept relatively short to minimize the risk of reflections.

Figure 3:
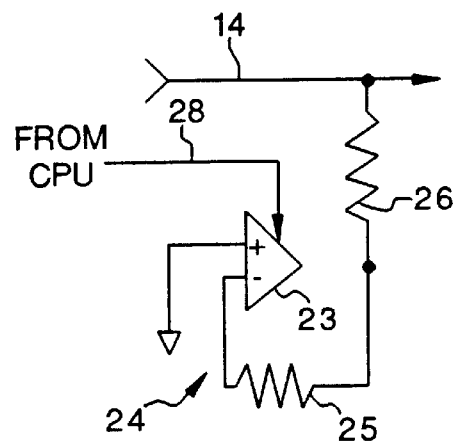
FIG. 3 is a schematic diagram of a controllable input termination in the conditioner and multiplexer of FIG. 2.

Reference is now made to FIG. 3 wherein there is shown a block diagram of the switch 24 including an operational amplifier 23. The 75 ohm termination 26 is connected between the channel 14 and the output of the operational amplifier 23. A feedback resistor 25 is connected between the operational amplifier 23 negative input and the amplifier output. The positive input of the operational amplifier 23 is connected to ground. Line 28 over which the control command is transmitted is connected to the enable input of the operational amplifier 23. The operational amplifier 23 preferably comprises a CLC411 high speed video operational amplifier manufactured by Comlinear Corporation of Fort Collins, Colo.

Referring again to FIG. 2, following selective termination, each of the analog image signals received from the imaging devices 12 over the channels 14 is buffered by a buffering amplifier 30. Each buffering amplifier 30 generates from the received analog image signal and outputs on lines 32 and 34 a unity gain buffered image signal. The unity gain buffered image signal on line 32 is output for further processing in the conditioner and multiplexer 22 in a manner to be described. The unity gain buffered image signal on line 34 is output from the multiplexer 22 for sync strip processing in a manner to be described. Each buffering amplifier 30 further generates from the received analog image signal and outputs on line 36 an amplified gain buffered image signal. The amplified gain buffered image signal on line 36 is output from the image capturing device 10 through a 2x amplifier and 75 ohm resistor (not shown) to drive external video connections (comprising, perhaps, a display 38 for presenting the video images as shown in FIG. 1). The buffering amplifier 30 preferably comprises a CLC409 operational amplifier manufactured by Comlinear Corporation of Fort Collins, Colo., which, when properly terminated in 75 ohms, results in an exact representation of the input signal.

Each of the unity gain buffered image signals on lines 32 is next processed by a gain amplifier 40 that provides the necessary clamping, gain and offset signal conditioning required to scale each of the buffered image signals to the proper level for subsequent digitization as will be described. DC restoration prior to gain amplifier 40 clamping, gain and offset conditioning is provided by a series connected capacitor 42. The amplifiers 40 include two voltage controlled inputs 44 and 46. The first input 44 is for gain control, and the second input 46 is for offset.

Figure 4:
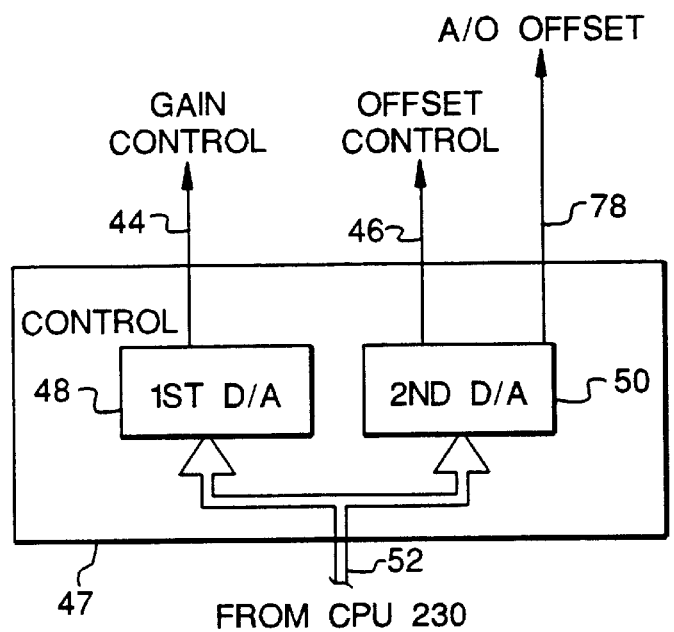
FIG. 4 is a block diagram of a gain amplifier control device for the image capturing device of FIG. 1.

Reference is now made to FIG. 4. The voltages for controlling the gain and offset of the amplifier 40 are output from a gain amplifier control device 47 (FIG. 2) comprising a pair of dual channel octal D-A converters 48 and 50 driven by digital signals received on bus 52 from CPU 230. The voltages output from the dual channels of the first octal D-A converter 48 drive the gain control input 44 of the amplifier 40 with both a course and a fine adjustment. The voltage output from a first channel of the second octal D-A converter 50 drives the offset control input 46 of the amplifier 40.

Referring now again to FIG. 2, the amplifier 40 further includes clamp control input 54 that is driven by a clamp gate signal output from a counter (not shown) programmed by CPU 230. When the clamp gate signal applied to the output enable input 54 is active, the input on line 32 is clamped to offset control input 46. The clamp gate signal is precisely timed to be active during the horizontal back porch 58 of the analog image signal 60 (see FIG. 5) output from the imaging device 12. Following clamping, gain adjusting and offset conditioning, the buffered unity gain buffered image signal received on line 32 is output as a conditioned image signal on line 62. The amplifier 40 preferably comprises an LM1201 operational amplifier manufactured by National Semiconductor.

The signal conditioner and multiplexer 22 provides multiplexing functionality by isolating a selected one of the channels 14 from all of the others thus choosing one of the conditioned image signals output on lines 62 for output as a multiplexed image output signal on line 68. This isolation is accomplished through the use of a two stage multiplexer design. The first multiplexing stage of the signal conditioner and multiplexer 22 comprises the gain amplifiers 40 that are also used in the manner described above for performing signal conditioning. The second multiplexing stage of the signal conditioner and multiplexer 22 comprises a plurality of amplifiers 64 (each must have a controllable output disable capability) connected to receive the conditioned image signals output on lines 62. The outputs 66 from the amplifiers 64 are connected together as the multiplexed output 68 from the signal conditioner and multiplexer 22.

The multiplexing operation performed by the signal conditioner and multiplexer 22 selects a particular one of the channels 14 to be connected to the single channel multiplexed output line 68. Execution of the multiplexing operation involves setting the desired gain for that selected channel using the gain control input 44 of the gain amplifier 40 and enabling (with an active signal present on control input 70) the output of the corresponding amplifier 64. Selection of the channel 14 for output 68 is completed by reducing the gain of the remaining gain amplifiers 40 to a minimum level and disabling (with an inactive signal present on control input 70) the output of the remaining amplifiers 64. This operation provides the necessary crosstalk attenuation needed to perform the multiplexing operation. The gain control over the amplifiers 40 for the first multiplexing stage is performed by outputting signals from the first octal D-A converter 48 of the gain amplifier control device 47 (FIG. 4). The enable/disable selection of the amplifiers 64 for the second multiplexing stage is controlled by digital signals received on input 70. The amplifiers 64 preferably comprise CLC411 high speed video operational amplifiers manufactured by Comlinear Corporation of Fort Collins, Colo.

With reference now again to FIG. 1, the image capturing device 10 includes an analog-to-digital (A/D) prescaler 74 that mixes the multiplexed image output signal received on line 68 from the signal conditioner and multiplexer 22 with a variable offset adjustment to generate an offset multiplexed image signal output on line 76. Signals output from the second octal D-A converter 50 of the gain amplifier control device 47 (FIG. 4) drive an input 78 of the A/D prescaler 74 with both a course and a fine variable offset adjustment to the multiplexed image output signal.

The image capturing device 10 also includes a sync stripper circuit 80 which receives the unity gain buffered image signals output on the lines 34 from the signal conditioner and multiplexer 22. The sync stripper circuit 80 includes a multiplexing functionality for selecting one of the received unity gain buffered image signals for sync strip processing, the selected signal corresponding to the particular one of the channels 14 connected by signal conditioner and multiplexer 22 to the single channel multiplexed output line 68. The sync stripper circuit 80 then recovers the horizontal sync (H-sync), vertical sync (V-sync output on line 82) and composite sync (C-sync output on line 84) from the selected unity gain buffered image signal.

The horizontal sync, vertical sync and composite sync may alternatively be recovered from a local sync signal generated by a local sync generator 86. Use of the local sync signal is only for self diagnostics. Similarly, the composite sync may be obtained from an external C-sync generator or external H-sync and V-sync generator 88.

Following recovery of the composite sync by the sync stripper circuit 80 or as applied from the external generator 88, the composite sync signal is delayed by a programmable delay 90 to generate a delayed C-sync signal on line 92.

The vertical sync output on line 82 and delayed composite sync output on line 92 are processed in a phase lock loop (PLL) circuit 94 to extract the pixel clock for the selected video signal corresponding to the particular one of the channels 14 connected by signal conditioner and multiplexer 22 to the single channel multiplexed output line 68 and processed by the A/D prescaler 74. The pixel clock signal is output from the phase lock loop circuit 94 on line 96.

The output pixel clock signal on line 96 and the offset multiplexed image signal output on line 76 are applied as inputs to a flash analog-to-digital (A/D) converter 98. Responsive to the received pixel clock signal, the flash analog-to-digital converter 98 synchronously samples the offset multiplexed image signal, detects signal voltage level, converts the voltage level to a digital value, and outputs the digital value on data bus 100. In such synchronous sampling, the frequency and phase of the pixel clock signal received on line 96 matches the frequency and phase of the pixel clock for the received offset multiplexed image signal. Thus, each pixel in the offset multiplexed image signal is preserved. The system 10 may further operate in a non-synchronous sampling mode wherein the pixel clock signal received on line 96 is selected to have a frequency at least twice the frequency of the pixel clock for the received offset multiplexed image signal.

Figure 5:
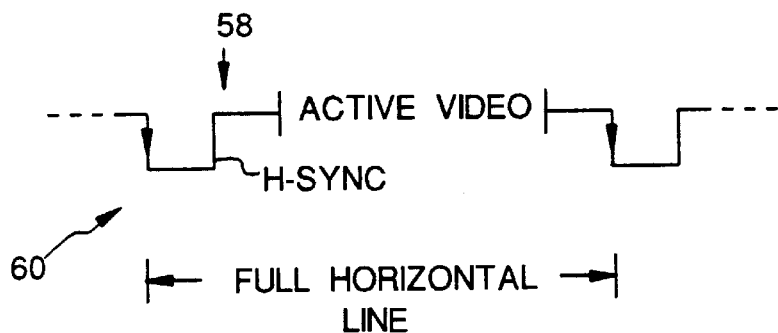
FIG. 5 depicts a representation of an analog image signal.

Reference is now made to FIG. 6A wherein there is shown a block diagram of PLL 94 including a high frequency phase lock loop (HFPLL) circuit 102 portion of the phase lock loop circuit 94. The horizontal sync recovered by the sync stripper circuit 80 is utilized as a reference to the high frequency phase lock loop circuit 102. In the feedback loop of the high frequency phase lock loop circuit 102 there is a divisor 104 which is set to the exact number of pixel clock cycles that occur between the leading edges of consecutive horizontal sync pulses (FIG. 5). The frequency generated in the feedback loop before this divisor 104 is accordingly equal to the desired pixel lock frequency.

The high frequency phase lock loop circuit 102 comprises a phase detector 106, a low pass filter 108, a voltage controlled oscillator 110 and the reference divisor 104. The phase detector 106 and reference divisor 104 are implemented by a Motorola MC 145170 integrated circuit wherein the divisor (N) may be set through an input 112 to any value between 40 and 65,535. The voltage controlled oscillator 110 comprises a Motorola MC 12148 MECL.

The transfer function of PLL 102 is $G(s)H(s)/[1+G(s)H(s)]$ where G(s) is the feed forward gain and H(s) is the feedback gain. G(s) is a product of the phase detector gain, filter/integrator gain and VCO gain while H(s) is the divider multiplier. Referencing "Successfully Implementing Phase Locked Loops into High Performance Clock Networks," Todd Pearson and Tom Borr, Motorola, 1996 High-Performance System Design Conference:

"The overall PLL bandwidth is described by the following equation: $K=(Kd*Kh*Kv)/M$. The bandwidth is the product of the phase detector (Kd), loop filter gain (Kh) and VCO gain (Kv) of the PLL divided by the feedback divide ratio M . . . . The selection of the feedback divide ratio enables the user flexibility in setting the bandwidth of the PLL. However, care must be maintained to insure that the overall bandwidth chosen fits within the "stable region of the loop filter." . . . Optimizing the lock time and the slew rate as well as the tracking rate of the PLL can be obtained by proper selection of the PLL bandwidth."

According to an aspect of the present invention, the PLL 102 enables 64 programmable VCO 110 gain steps (Kv) which allows the PLL bandwidth to be optimized for a specific set of input frequencies. Referring to FIG. 3, the VCO 110 frequency determining tank circuits connected to oscillator IC 310 consists of varactors 300, 302, 304, and inductor 300 with the frequency–1/2TT (Sq. Rt. L11*Ct) where Ct is the sum of the voltage dependent capacitance of 300 in parallel with 302+304. The "innovative" circuitry is 300 driven by (D-A) 306 through amp 308 level shifting topology (converts 0–5 volts from D-A 306 to –2 to +12v). For a given range of control voltage coming from the filter/integrator 108 and feeding the 300–302 tank, a series of VCO frequency vs. voltage outputs can be obtained for the 64 programmable steps of D-A 306. The VCO gain is equal to the slope of the programmed drive curve at the programmed frequency.

A known VCO design had two tank circuits driven by a filter/integrator via a multiplexer. The outputs of the VCOs in turn went into another multiplexer whose output fed the divider network. In addition, the filter/integrator circuitry had multiplexed resistors to discreetly set its feedback network. The present invention allowed for only two distinct VCO curves, limiting optimization of the PLL bandwidth for all inputs necessary.

Figure 12:
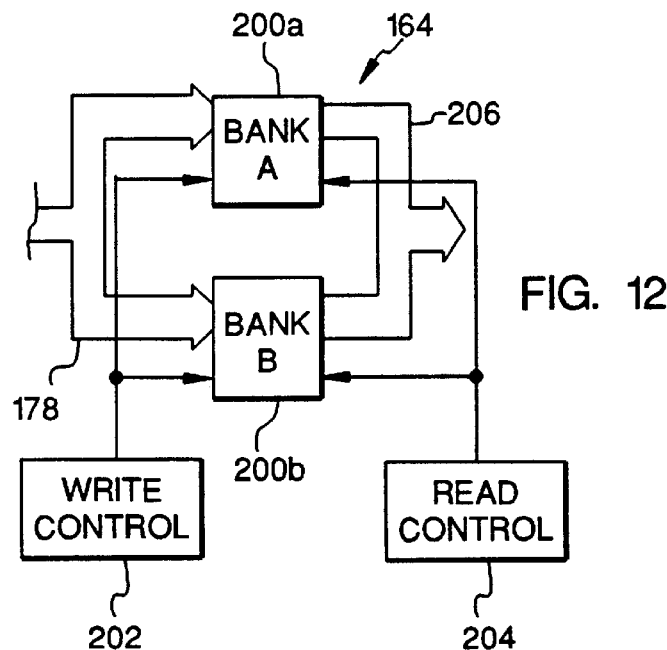
FIG. 12 is a block diagram of the frame buffer within the data buffer of FIG. 7.

The FIG. 12 circuitry eliminated the need for the multiplexed resistors in the filter/integrator network allowing for a more optimized PWB layout of this circuitry. IT also reduced the total part count for the function, reduced part and assembly cost, increased design robustness-performance. Clock jitter can be minimized by adjusting the voltage applied to varactor 304. Greater control of the dynamic characteristics of the loops response to signal disturbances is thus achieved.

The feedback loop further includes a second divisor (M) 116 connected between the voltage controlled oscillator 110 and the reference divisor 104 to prescale the frequency of the signal output by the voltage controlled oscillator to be within the range of the desired pixel clock frequency for the offset multiplexed image signal selected for digitization.

During the vertical interval of the video signal, it is known that some types of imaging modalities 12 insert a number of short pulses times at double the rate as the horizontal sync. If the inserted short pulses occur inside the vertical sync pulse itself, the pulses comprise serration pulses. Outside of the vertical sync pulse time frame, these pulses comprise equalization pulses. If these inserted pulses are properly timed, every other pulse is discarded, restoring the original H-sync frequency, and they are detected by the phase detector 106 of the high frequency phase lock loop circuit 102 and no frequency perturbation is introduced into the generated and output pixel clock signal (line 96). If, on the other hand, the pulses are improperly timed or are missing, the high frequency phase lock loop circuit 102 becomes unlocked, and does not re-lock until after several valid horizontal sync pulses are received. This introduces a horizontal skewing at the beginning of each frame of the sampled and digitized video image.

Figure 6:
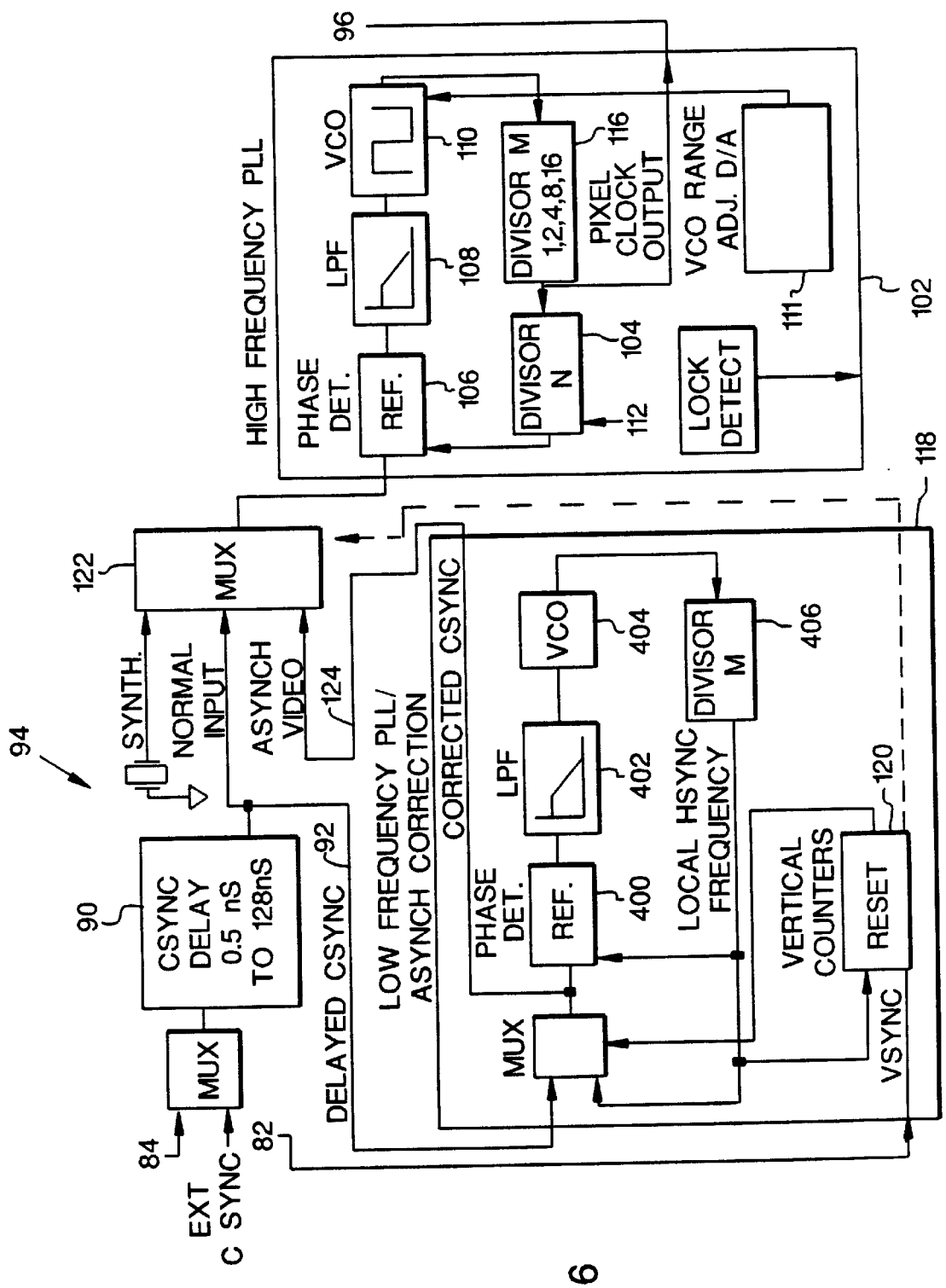
FIG. 6 is a block diagram of a phase lock loop circuit for the image capturing device of FIG. 1.

To remedy the foregoing problem experienced during the vertical interval, the phase lock loop circuit 94 further includes a low frequency phase lock loop circuit 118 shown in FIG. 6 operating to provide a stable pulse train at the horizontal sync frequency rate output on line 120. Multiplexer 122 receives both the low frequency phase lock loop circuit 118 generated horizontal sync on line 124 and the horizontal sync generated by the sync stripper circuit 80 and delayed by delay 90. A counter 120 in the low frequency phase lock loop circuit 118 monitors the vertical sync generated by the sync stripper circuit 80 to identify each vertical interval. During the vertical interval, the counter 120 controls the multiplexer 122 to select for output to the phase detector 106 of the high frequency phase lock loop circuit 102 the horizontal sync generated by the low frequency phase lock loop circuit 118 instead of the sync stripper 80 output. Thus, a stable pulse train at the horizontal sync frequency rate is output during the vertical interval to maintain the timing of the generated pixel clock in instances where the serration/equalization pulses are missing or inaccurate.

The low frequency phase lock loop circuit 118 comprises a phase detector 400, a low pass filter 402, a voltage controlled oscillator 404, and a divisor 406. These functions are provided by an Integrated Circuit Systems ICS 1522. The ICS 1522 essentially is a complete PLL system, like that shown in FIG. 6 (without Block 116). The output frequency is H-sync, rather than the much higher pixel clock frequency. Also, the time constant of the LPF is much longer, thus the ability to "coast" during the bad V-sync period, without much drift from the desired H-sync frequency. The reference (input) signal is cut off during the "LFPLL" insertion interval, so as to not "confuse" the LFPLL and affect, it's operation. Frequency. The start and end times for insertion are determined by a "post-EQ" counter, and a "pre-EQ" counter. Both of these counters start counting H-sync pulses when triggered by V-sync. The pre-EQ counter is set to a much larger count than the post-EQ counter. Since the V-sync-H-sync pulse train is repetitive, it appears to "start" the insertion sequence some number of H-sync pulses before V-sync. Then, the post-EQ counter, which is set to a low value, stops the insertion sequence after a few counts after V-sync.

Figure 7:
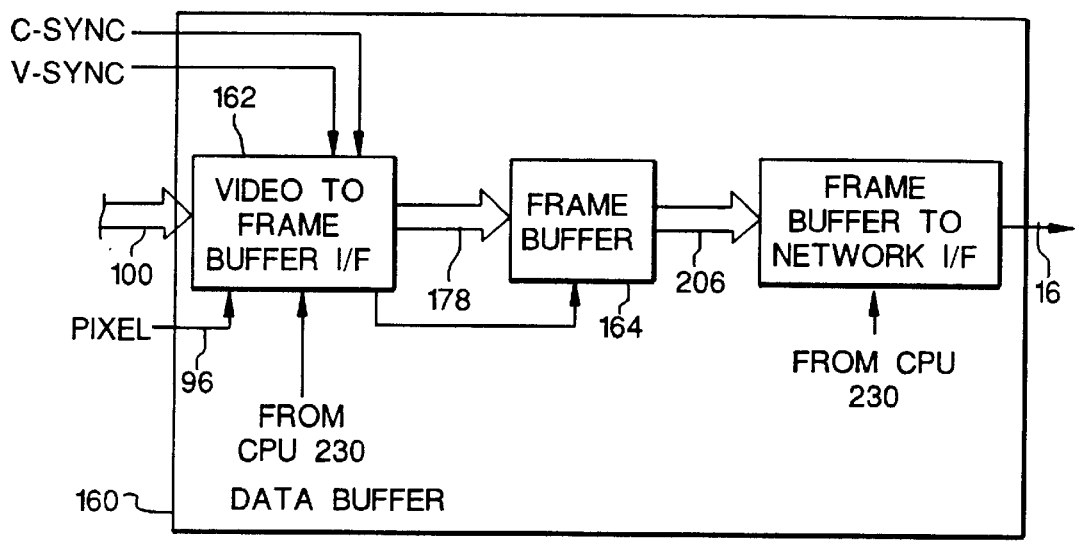
FIG. 7 is a block diagram of a data buffer for the image capturing device of FIG. 1.

Reference is now again made to FIG. 1, wherein the device 10 further includes a data buffer 160 for processing the digital data output from the analog-to-digital converter 98 on data bus 100, storing the data in a frame buffer at an appropriate time relative to the digitized video signal, and interfacing the device 10 to the digital communications network bus 16. A block diagram the data buffer 160 is shown in FIG. 7. The data buffer 160 includes a video-to-frame buffer interface 162, a frame buffer 164, a frame buffer to network interface 166, and a processor interface 168.

Figure 8:
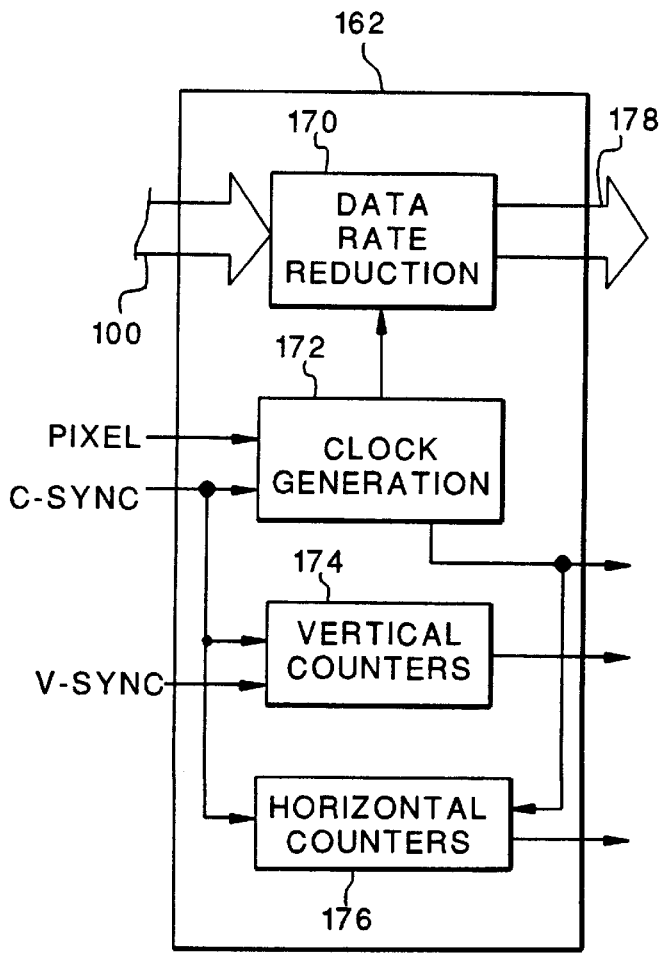
FIG. 8 is a block diagram of a video to frame buffer interface circuit within the data buffer of FIG. 7.

Reference is now made to FIG. 8 wherein there is shown a block diagram of the video-to-frame buffer interface 162 including a data rate reduction circuit 170, clock generation circuit 172, vertical counters 174 and horizontal counters 176. The data rate reduction circuit 170 converts the eight bit data received on bus 100 from the A/D converter 98 at a very high rate (for example, 150 MHZ) to thirty-two bit data at a slower rate (for example, 37.5 MHZ). The reduced data is output from the circuit 170 on bus 178. The operation of the data rate reduction circuit is controlled by control signals output from the clock generation circuit 172.

Figure 9:
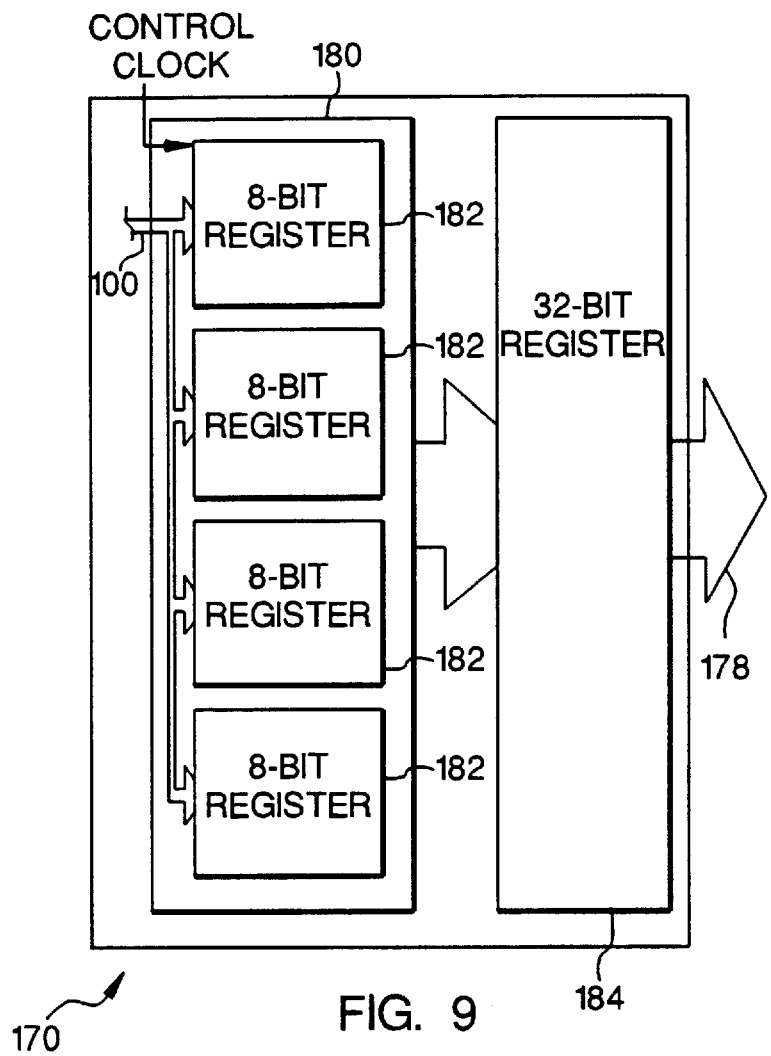
FIG. 9 is a block diagram of a data rate reduction circuit in the video to frame buffer interface circuit of FIG. 8.

Reference is now made to FIG. 9 wherein there is shown a block diagram of the data rate reduction circuit 170. The conversion of the data by the data rate reduction circuit 170 is accomplished by the use of a first thirty-two bit register 180 comprising four eight bit registers 182. Each eight bit register 182 is clocked at the rate of the pixel clock divided by four (with signals output from the clock generation circuit 172) such that four successive eight bit words received on bus 100 are loaded into the registers 182. Following complete loading into the first register 180, the thirty-two bit data stored in the first register is clocked into a second thirty-two bit register 184.

Referring now again to FIG. 8, the vertical counter circuit 174 receives the C-sync and V-sync signals output from the sync stripper 80 (FIG. 1), and counts the number of H-sync pulses after each V-sync pulse to mark the beginning and end of active video (FIG. 5) in the vertical direction. The vertical counter circuit includes three separate counters. The first counter counts the number of H-sync pulses from a V-sync pulse until the beginning of active video in the vertical direction. The second counter counts the number of H-sync pulses from the beginning of the active video to the end of the active video. The third counter, used only when the device 10 operates in a non-interlaced mode, counts the number of H-sync pulses during the filling of the frame buffer 164 (FIG. 7) as will be described in more detail herein.

The horizontal counter 176 receives the C-sync signal output from the sync stripper 80 (FIG. 1) and a pixel clock related output from the clock generation circuit 172, and counts the number of pixel clocks after the leading edge of the H-sync pulse up until the beginning and the end of active video in the horizontal direction. The horizontal counters are clocked at the rate of the pixel clock divided by four such that one count of the horizontal counters 176 equals four counts of the pixel clock. The horizontal counter circuit includes four separate counters. The first counter counts from H-sync to the beginning of active video in the horizontal direction. The second counter counts from the beginning of active video to the end of active video. The third counter counts from H-sync to the beginning of a clamp signal. The fourth counter counts from the beginning of the clamp signal to the end of the clamp signal.

In a commercially available High Speed Video Capture product, a manual method is used for determining the delay line setting for the best H-sync to pixel clock phase relationship. In this method, the setup software would print 16 test images on a laser film printer. Each image corresponded to a different setting of the delay line. The film would then be developed and viewed on a light box. The film with the best attributes for the test would be chosen and its corresponding delay line setting would be manually entered into the setup program. This method was longer (1 hour vs. 30 seconds) and less accurate than the automated method used in the present invention which has improved accuracy at high frequencies.

Figure 10:
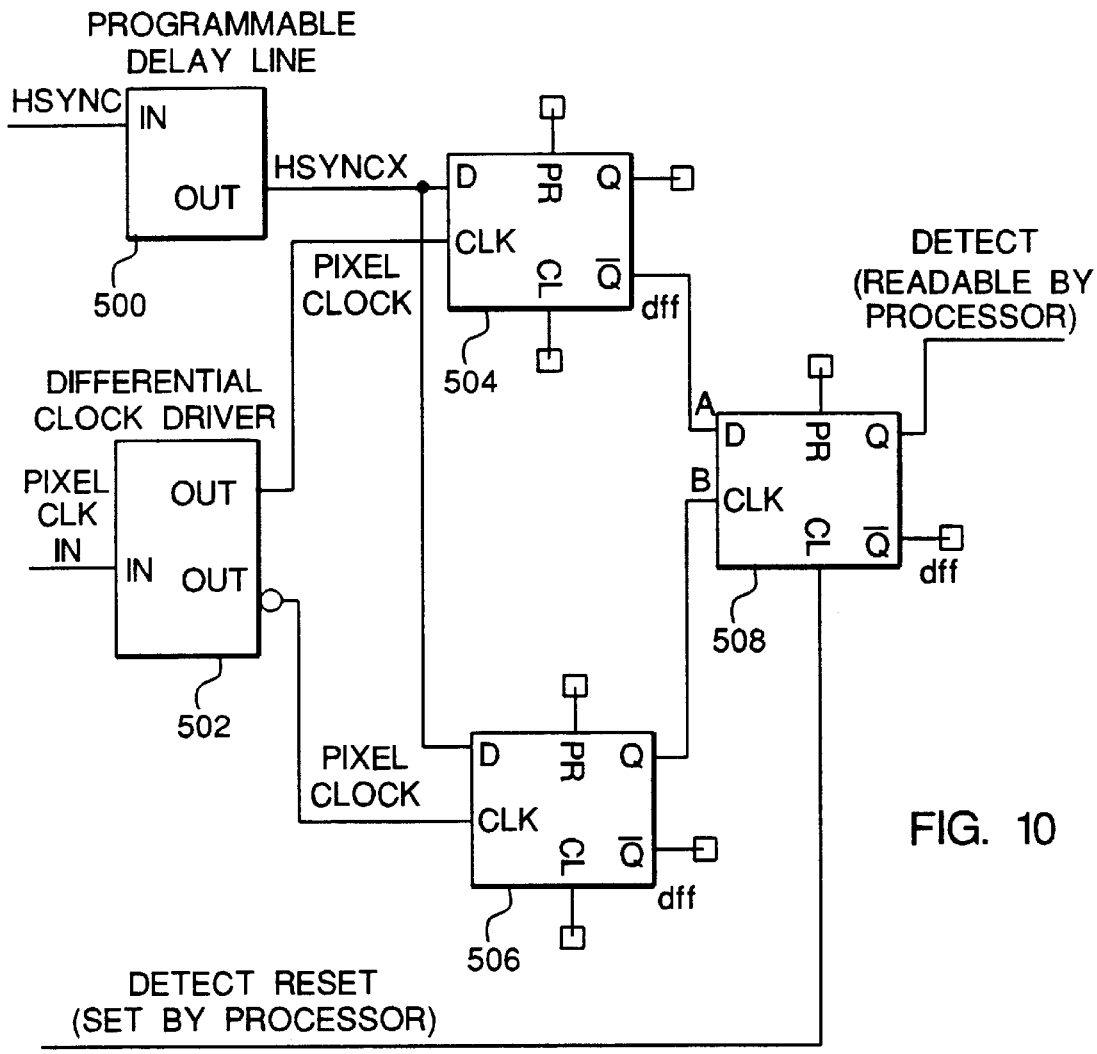
FIG. 10 is a block diagram for the clock generation circuit in the video to frame buffer interface circuit of FIG. 8.

The detect circuit of the present invention is used to properly phase align two signals, H-sync and pixel clock. As shown in FIG. 10, the detect circuit of clock generation circuit 172 includes a programmable delay line 500, clock driver 502, flip-flops 504, 506, and D flip-flop 508. The signals are synchronous to each other; however, the phase relationship is unknown and will change based upon what type of video modality is setup to acquire. The H-sync signal is sampled by pixel clock using a D flip-flop. A problem occurs if the phase difference between the rising edge of H-sync and the rising edge of pixel clock is small. When the phase difference is small, the D flip-flop cannot sample consistently.

The detect circuit allows the microprocessor to adjust the phase relationship between the two signals and provides feedback to the microprocessor to detect when the phase relationship crosses the boundary where the rising edge of H-sync and the falling edge of pixel clock are phase aligned. This is the setting at which the rising edge of H-sync and the rising edge of pixel clock have the maximum phase difference.

The detect circuit uses a programmable delay line to delay H-sync in relationship to pixel clock to provide the phase adjustment between the two signals. The detect circuit samples H-sync on both the rising edge and falling edge of pixel clock and sets a D flip-flop when the rising edge of H-sync occurs after the rising edge of pixel clock but before the falling edge of pixel clock. The D flip-flop can be read and reset by the microprocessor. The following is the algorithm used by the microprocessor to detect when the maximum phase difference boundary is crossed.

1. reset the detect bit
2. read the detect bit-if detect=0 GOTO 5
3. increment the delay line
4. goto 1
5. increment the delay line
6. reset the detect bit
7. read the detect bit-if detect=1 GOTO 5

(Note: When detect=0, the maximum phase difference boundary has been crossed. This is the delay line setting that should be used.)

Figure 11A:
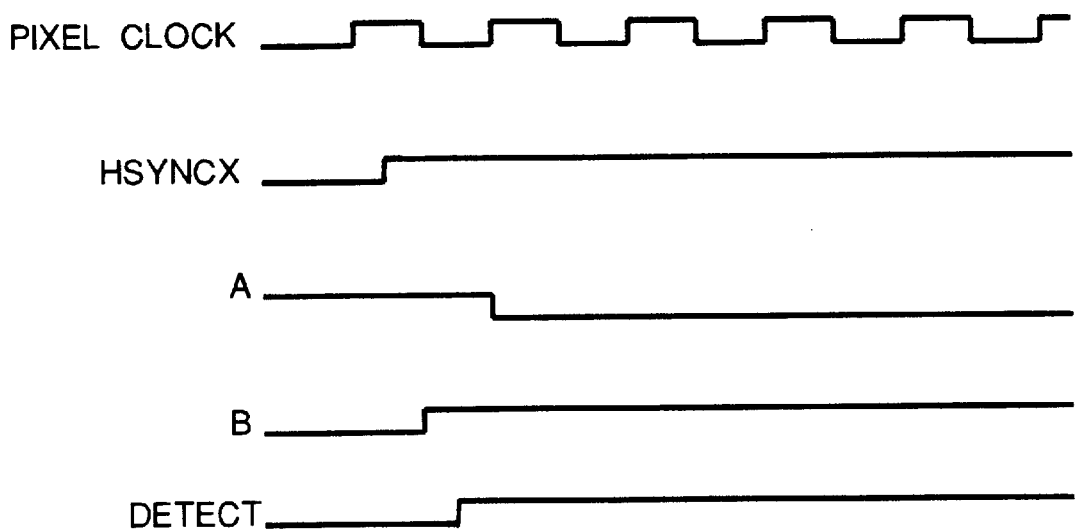
FIGS. 11A and 11B are timing diagrams illustrating the operation of the H-sync to pixel clock phase detector within the clock generation circuit of FIG. 10.
Figure 11B:
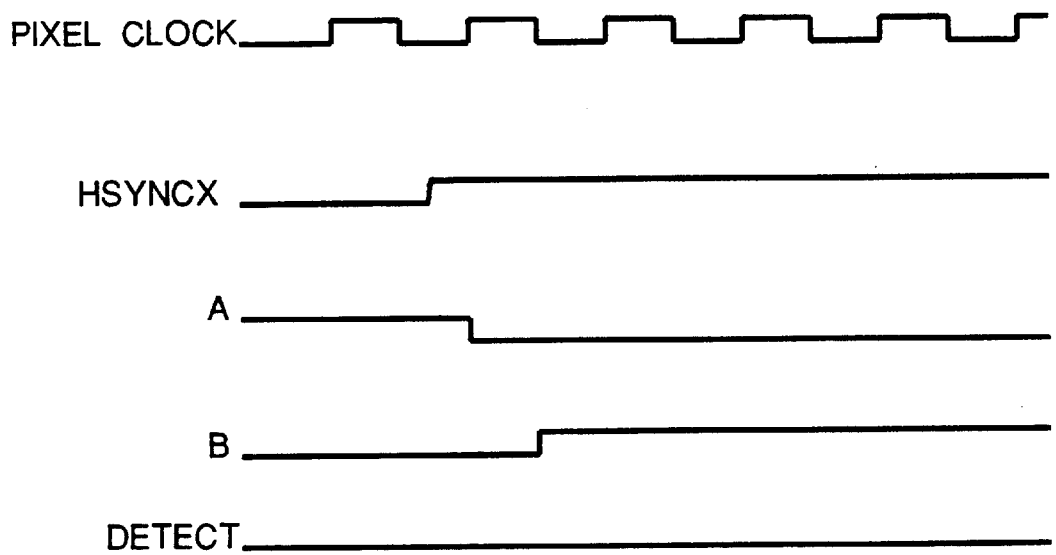
Figure 14:
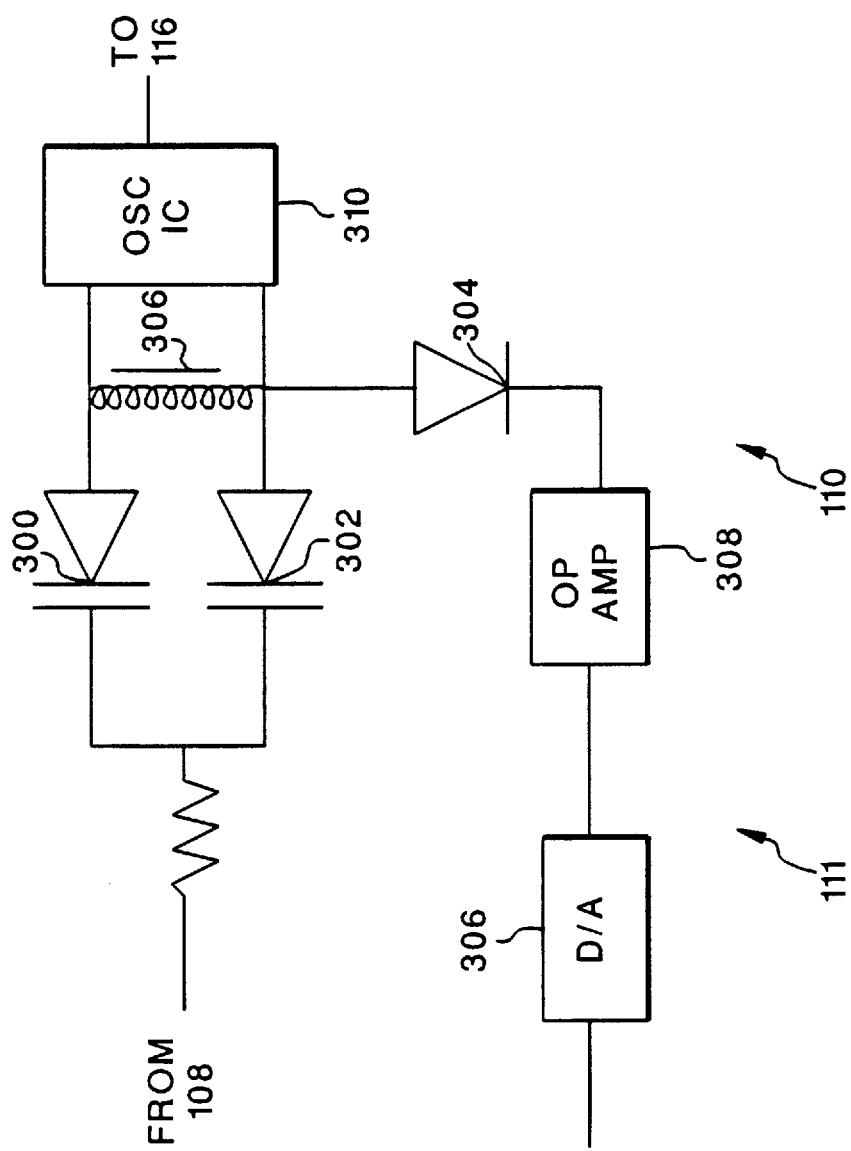
FIG. 14 is a schematic diagram of a VCO circuit according to a feature of the present invention.

FIGS. 11A and 11B illustrate the operation of the detect circuit of FIG. 10.

Reference is now again also to FIG. 7 and also to FIG. 12 wherein there is shown a block diagram of the frame buffer 164. The frame buffer 164 includes two thirty-two bit wide memory banks 200 connected to the bus 178. In interlaced video mode, memory bank A 200a stores even video frames and memory bank B 200b stored odd video frames. In non-interlaced video mode, the two banks 200a and 200b appear as one contiguous memory. The frame buffer further includes a write control circuit 202 and a read control circuit 204. The write control circuit 202 is connected to receive signals output from the video to frame buffer interface circuit 162, and in response thereto control the writing of data into the memory banks 200 from the bus 178. The read control circuit 204 conversely operates to control the reading of data from the memory banks 200 for output on bus 206.

Figure 13:
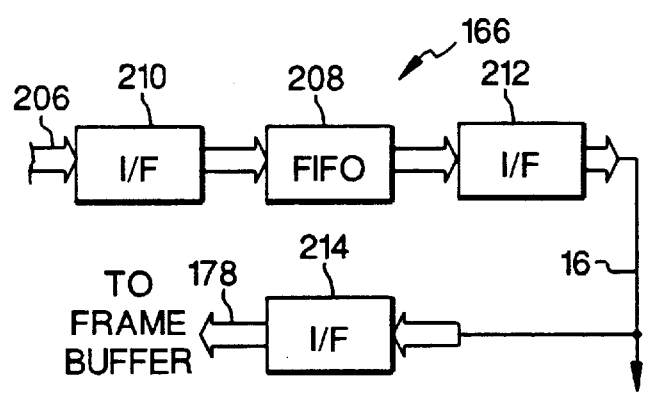
FIG. 13 is a block diagram of the frame buffer to network interface within the data buffer of FIG. 7.

Reference is now also made to FIG. 13 wherein there is shown a block diagram of the frame buffer to network interface 166 comprising a synchronous first-in-first-out (FIFO) queue 208 and three separate interfaces: a frame buffer to FIFO interface 210; a FIFO to network interface 212; and a network to frame buffer interface 214.

The frame buffer to FIFO interface 210 has four modes of operation. The first mode comprises a non-interlaced mode wherein the frame buffer 164 is read out bank A 200a first, then bank B 200b. In the second mode, comprising interlaced mode, banks A and B are alternatively read out on a per line of video data basis to form a non-interlaced image from an interlaced image. The third mode utilizes and reads from only bank A 200a. The fourth mode utilizes and reads from only bank B 200b. Three counters are used for the interface 210. The first counter counts the number of frame buffer reads to the end of a line of video data, and is used in the interlaced mode. The second counter counts the number of lines read out of the frame buffer and is useful in the non-interlaced mode. The third counter counts the total number of lines read out of the buffer and generates an interrupt when all lines have been read. The interface and its counters are implemented using an Altera programmable logic device referred to as FMFIFO.

The FIFO to network interface 212 has two modes of operation. The first mode, comprising a FIFO mode, connects the FIFO 208 to an interface internal FIFO. In the second mode, comprising a pass through mode, the FIFO 208 is buffer connected to the network bus 16. For example, the network bus 16 may comprise a PCI bus. In the first mode, the device 10 operates as a PCI master or as a non-burst capable PCI slave. In either mode, the physical connection from the FIFO 208 to the network bus 16 is the same, with different control signal connection and logic being used. The interface 212 control logic is implemented using an Altera programmable logic device referred to as PCIMEM.

The network to frame buffer interface 214 allows for the writing of data from the network bus 16 to the frame buffer 164. The interface includes only one mode of operation, comprising a FIFO mode like that with the interface 212. The interface 214 control logic is implemented using an Altera programmable logic device referred to as PCIMEM.

Reference is now again made to FIG. 1. The device 10 further includes a central processing unit (CPU) 230 for controlling device operation. In particular, the CPU 230 is used to control all of the programmable hardware within the device 10. Thus, the CPU 230 outputs the signal on line 28 to control the termination switches 24 (FIG. 2). The CPU 230 further outputs the signal on line 70 to control the operation of the amplifiers 64 in the multiplexing operation. The CPU 230 still further outputs the signals on bus 52 specifying the operation of the control circuit 47 and the signals output from its D-A converters 48 and 50. The CPU 230 also output the signal on line 78 controlling the operation of the A/D prescaler 74. The CPU 230 still further outputs the signals for controlling the operation of the write and read controllers 202 and 204 (FIG. 12), respectively, of the frame buffer 164 (FIG. 7).

The CPU code (firmware) is contained in an EEPROM which can be reprogrammed by a command from the hose processor over the PCI bus. A small amount of code is permanently contained inside the CPU to allow the reprogramming of the EEPROM to occur. Since the host processor will be connected remotely to a central location, new codes can be installed in all boards throughout the world from a central location.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

PARTS LIST 10 image capturing device
12 imaging devices 14 channels
16 digital communications network bus
18 data store
20 printer
22 (1) channel
22 multiplexer
23 operational amplifier
24 switch
25 feedback resistor
26 75 ohm termination
28 line
30 buffering amplifier
32,34 lines
36 line
38 display
40 gain amplifier
42 series connected capacitor
44,46 voltage controlled inputs
47 gain amplifier control device
48,50 dual channel octal D-A converters
52 bus
54 clamp control input
58 horizontal back porch
60 analog image signal
62 line
64 amplifiers
66 outputs
68 multiplexed output line
70 control input
74 analog-to-digital (A/D) prescaler
76 line
78 input
80 sync stripper circuit
82 line
84 line
86 local sync generator
88 V-sync generator
90 programmable delay
92 line
94 phase lock loop (PLL) circuit
96 line
98 flash analog-to-digital (A/D) converter
100 data bus
102 high frequency phase lock loop circuit
104 reference divisor
106 phase detector
108 low pass filter
110 voltage controlled oscillator
112 input
116 second divisor (M)
118 low frequency phase lock loop circuit
120 line
122 multiplexer
124 line
160 data buffer
162 video-to-frame buffer interface
164 frame buffer
166 frame buffer to network interface
168 processor interface
170 data rate reduction circuit
172 clock generation circuit
174 vertical counters
176 horizontal counters
178 bus
180 first thirty-two bit register
182 eight bit registers
184 second thirty-two bit register
200*a* memory bank A
200*b* memory bank B
202 write control circuit
204 read control circuit
206 bus
208 first-in-first-out (FIFO) queue
300,302,304 varactors
306 D-A
308 amp
310 oscillator IC
400 phase detector
402 low pass filter
404 voltage controlled oscillator
406 divisor
500 programmable delay line
502 clock driver
504,506 flip-flops
508 D flip-flop what is claimed is:

1. An H-sync to pixel clock phase detection circuit comprising:

a programmable delay line for delaying an H-sync signal;

a differential clock driver circuit for producing a pixel clock signal and a pixel clock/signal from a pixel clock signal input;

a first D flip-flop having D and CLK inputs and a $\overline{Q}$ output;

a second D flip-flop having D and CLK inputs and a Q output; wherein said delayed H-sync signal from said programmable delay line is applied to said respective D inputs of said first flip-flop and said second flip-flop, wherein said pixel clock signal from said differential clock driver circuit is applied to said CLK input of said first D flip-flop, and wherein said pixel clock/signal from said differential clock driver is applied to said CLK input of said second D flip-flop; and a third D flip-flop having D and CLK inputs and a Q output; wherein said $\overline{Q}$ output of said first D flip-flop is applied to said D input of said third D flip-flop, wherein said Q output of said second flip-flop is applied to said CLK input of said third D flip-flop; and wherein said Q output of said third D flip-flop is set when the rising edge of H-sync occurs after the rising edge of pixel clock, but before the falling edge of pixel clock.

* * * * *